Sept. 5, 1939.   T. A. RICH ET AL   2,172,176
DEMAND METER
Filed May 28, 1938   2 Sheets-Sheet 1

NORMAL LOAD

WELDING LOAD

LOAD CURRENT

DEMAND METER INDICATION

Inventors:
Theodore A. Rich,
George F. Gardner,
by *Harry E. Dunham*
Their Attorney.

Sept. 5, 1939.   T. A. RICH ET AL   2,172,176
DEMAND METER
Filed May 28, 1938   2 Sheets-Sheet 2
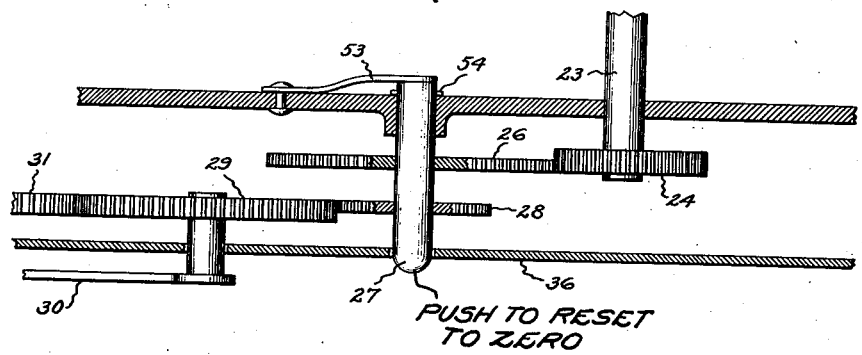
PUSH TO RESET TO ZERO
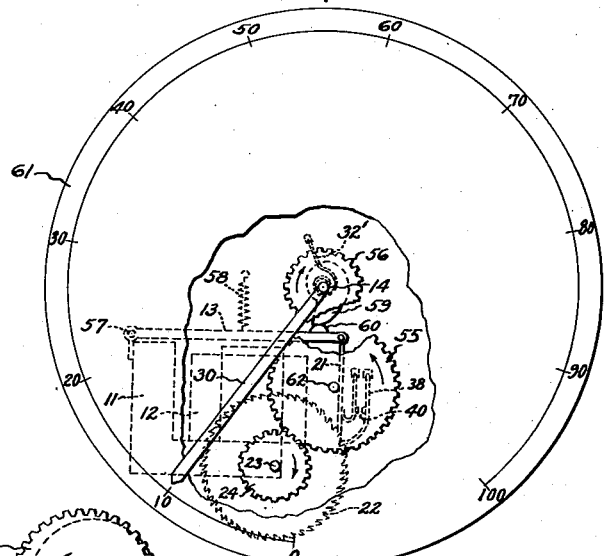
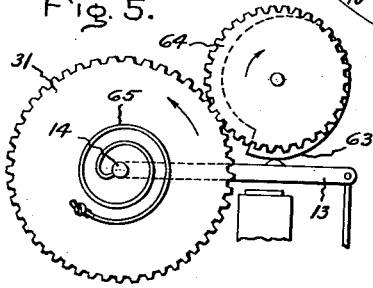
Inventors:
Theodore A. Rich,
George F. Gardner,
by Harry E. Dunham
Their Attorney.

Patented Sept. 5, 1939

2,172,176

UNITED STATES PATENT OFFICE 2,172,176

DEMAND METER

Theodore A. Rich, Schenectady, and George F. Gardner, Scotia, N. Y., assignors to General Electric Company, a corporation of New York Application May 28, 1938, Serial No. 210,738

6 Claims. (Cl. 171—95)

Our invention relates to demand meters and in particular to a demand meter for measuring the peak current demand of such circuits as supply electric welding apparatus and the like where current values of large magnitude are likely to occur for short periods of time.

An electric consumer who draws excessive current from a power circuit for short time periods more or less frequently, as for example by the operation of electric welding apparatus, should be charged in accordance with the expense which he puts the power supply company to in order to supply such service. This type of load causes a substantial variation in line voltage, light flickering and other annoyances to other customers supplied from the same power line, unless the power generating and transmitting apparatus supplying the load is liberally designed and regulated so as to prevent material voltage variation when peak current surges occur. Current surges of the type to which reference is made may be of short duration. The amount of actual energy taken from the power line is small in comparison to the stand-by power apparatus which must be available for this type of customer and hence the usual form of watthour meter and watthour demand meter do not in themselves provide an adequate measure of the added expense of supplying this type of customer.

Our invention pertains to a peak current demand meter which may be used to provide a measure on which to base a proper charge for the special service to which reference has been made. Such peak demand meter may supplement other metering equipment and may also be used to determine the extent of peak current load of a customer or group of customers as an aid to the power company in determining when and to what extent additional equipment is required.

Figure 1:
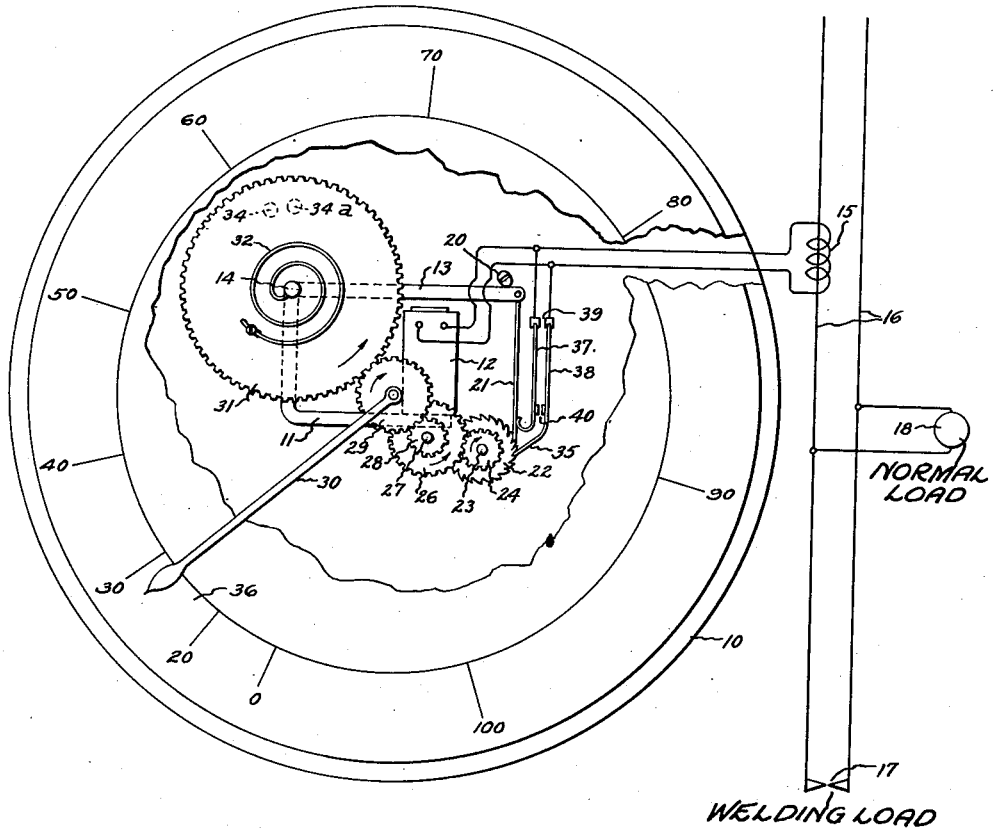
Figure 2:
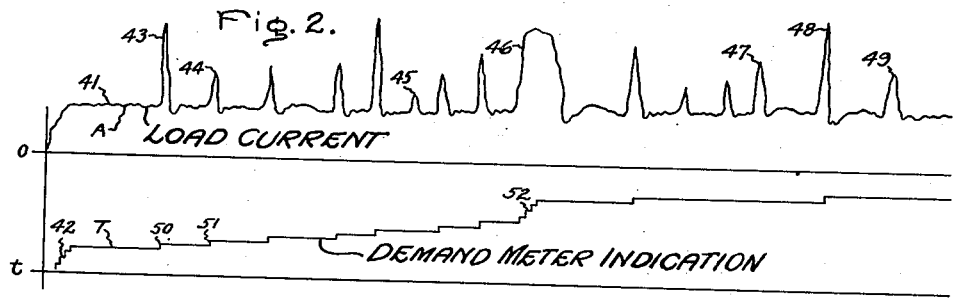

The features of our invention which are believed to be novel and patentable will be pointed out in the claims appended hereto. For a better understanding of our invention, reference is made in the following description to the accompanying drawing, in which Fig. 1 represents a face view of a peak current demand meter embodying our invention, such meter having sufficient of its interior mechanism exposed to illustrate the essentials of its operative construction; Fig. 2 represents a current load curve in which peaks occur, together with a curve indicating the corresponding operation of our meter when subjected to such a current load; Fig. 3 illustrates a side view detail of certain of the gears of Fig. 1 to indicate how the demand meter may be reset by a gear demeshing arrangement; Fig. 4 represents a demand meter embodying our invention having a variable air gap operating electromagnet; and Fig. 5 shows how operating principles used in Figs. 1 and 4 may be combined.

Referring to Fig. 1, 10 indicates in outline a suitable casing for housing and supporting the demand meter mechanism. In the rear of the casing is an electromagnet having a magnetic circuit 11, an energizing coil 12, and a movable magnetic armature 13 secured to a pivoted shaft 14. This electromagnet is energized from a current transformer 15 if the meter is used on an alternating current circuit. The load circuit to be metered is represented by the lines 16 and 1 may supply a load which may consist of electric welding apparatus designated at 17 and other electrical apparatus 18 such as motors, lights, etc.

The armature 13 is biased to a retracted position by an adjustable spring 32 and this position is determined by a stop post 20 having a flattened side so that by turning the post 20, the deenergized position of the armature may be adjusted. The armature 13 is provided with a ratchet pawl 21 which cooperates with a ratchet wheel 22 secured on a shaft 23 with a gear wheel 24. A stop pawl 35 is provided adjacent the ratchet wheel 22 to prevent backward rotation thereof.

Gear 24 meshes with a gear 26 secured on a shaft 27 with a gear 28. Gear 28 meshes with a gear 29 to which an indicating pointer 30 is secured. Gear 29 meshes with a gear 31. Gear 31 has the outer end of the spring 32 secured thereto, preferably in a way as to allow some adjustment thereof. The inner end of this spring is secured to the shaft of armature 13 as mentioned above. Gear 31 is preferably provided with a stop pin 34 arranged to strike a stop 34a. The stop 34a is in such a position as to stop gear 31 in a position to bring pointer 30 well toward a zero point on a scale 36 when the spring 32 is at substantially zero tension and just sufficient to raise armature 13 to the position shown when the electromagnet is deenergized.

When the electromagnet 12 is energized to attract its armature 13, the ratchet mechanism is operated and wheel 22 is advanced. Its direction of rotation and the directions of rotation of the several gears for advancing operations are indicated by arrows. This is such as to move pointer 30 upscale and to wind up spring 32. As armature 13 is attracted and ratchet wheel 22 advanced one tooth's distance, provision is made to short circuit the energizing coil 12 of the electromagnet whereby the same is deenergized until the armature returns to the unattracted position represented. This short-circuiting arrangement may consist of a pair of contact members 37 and 38 secured to terminal posts 39 connected in parallel to relay coil 12 and having their free contact ends bent towards the ratchet wheel as represented. Contact arm 37 has its free end resting lightly against pawl 21 when the latter is retracted, such that the contact member 37 retains the pawl against the ratchet wheel and when the pawl is advanced, contact member 37 is pushed outward slightly. Contact member 38 has its free end biased lightly against the ratchet wheel to form the stop pawl 35. When pawl 21 advances the ratchet wheel, pawl 35 also moves outward slightly to keep the contacts 40 open until stop pawl 35 drops behind the next tooth and moves inward. This closes the contacts at 40. This short circuiting action, which is effective only in the attracted position of the armature, does not occur until the ratchet wheel has been advanced a full tooth's distance and until stop pawl 35 has dropped behind the next tooth. Upon being short circuited, the electromagnet releases its armature, which then is retracted and, as pawl 21 drops behind the next tooth, the contacts 40 open to open the short circuit. When the contacts 40 open, another advancing operation will occur if the current flowing in load lines 16 is sufficient to again cause an attraction of armature 13.

It is seen that as the ratchet wheel 22 is advanced and pointer 30 is moved up-scale, spring 32 is being wound up to a greater and greater tension. This correspondingly increases the work which the electromagnet must do in attracting the armature 13 and advancing the ratchet wheel 22, since both the armature 13 and wheel 22 are subjected to the backward torque of spring 32, armature 13 directly, and ratchet wheel 22 through the gear train. When the tension of spring 32 reaches a point where for a given current flow in coil 12 the relay is unable to attract armature 13 against this tension, the advancing operation will cease until such time as a heavier current flow occurs.

The operation of the peak demand meter for different values of current flow may be pictured in Fig. 2. In this figure, curve A represents the current flowing in line 16, the line 0 representing zero current flow. Straight line $t$ represents the condition of substantially zero tension of spring 32 when the pointer 30 is at its zero position. The notched line T represents the increased tension of spring 32 as it is wound up. It is assumed that spring 32 was at initial or substantially zero tension at the beginning of the operation pictured at the left end of these curves and that the distance to the right represents time.

A fairly normal load current is first thrown on the line 16 as represented by current value 41. This may be the fairly steady load represented by the apparatus 18, Fig. 1.

This load current will cause the notching up of the demand meter and an increase in tension of spring 32 as represented by the part 42 of line T until the spring tension and pull of the electromagnet on armature 13 are balanced and no further advancing operations can occur for this value of load current. The subsequent current peaks including peaks 43, 44, 45, 46, 47, 48 and 49 of curve A represent current peaks of relatively short duration, for example, from a few seconds to a few minutes duration, such as are caused by operation of electric welding apparatus 17, Fig. 1. Current peaks 43, 44, etc., cause additional notching up operations of the peak demand meter as indicated by the step 50, 51, etc., of curve T. Peak 45 causes no additional notching up operation, although it might have done so had it occurred at a lower tension of spring 32. Current peak 46 is of such magnitude as to cause notching up of the demand meter and of such duration as to cause several notching up operations as indicated at 52. The demand meter has now been notched ahead and its spring tension increased until such peaks as 47 and 49 no longer cause a notching up operation, although they are greater than the peak 44 which did cause a notching up operation, when the spring 32 was at a lower tension. It is only such excessive peaks as 48 that now cause any advance of the demand meter.

The pointer 30 of the demand meter is thus advanced upscale by the movement of the armature 13 to and from attracted position and becomes a measure at the end of the metering period of the inconvenience caused by this customer or the undesirable character of the load taken from the power line over such period. Such current peaks as are represented cause voltage fluctuations unless, of course, the extra stand-by generating apparatus available and the power transmitting channel are liberally designed to take care of these undesirable fluctuations without causing voltage disturbances. This type of customer can be supplied with power only at considerable expense as compared to a customer with a load of normal uniformity and our demand meter is intended to serve as a basis for arriving at the proper additional charge to be made for the peak current load type of customer. The scale 36 of the demand meter may be graduated in any way desired but a scale graduated according to a square law conforms to the square law of operation of the device of Fig. 1, and we have shown a square law scale in Fig. 1. For example, the graduation mark 50 is ¼ the distance from zero to 100 on the scale. The pull of an electromagnet increases as the square of the flux density, and hence the meter will have four times the notching up pull at 100 amperes as it does at 50 amperes. The spring counter torque increases as the first power of the deflection and hence a square law scale is particularly appropriate for this meter. The graduations may represent minimum current values which will eventually cause the meter to deflect to the corresponding graduation. An indication of 50 on such a meter does not necessarily mean that the customer has not exceeded a 50 ampere peak. The indication approaches the maximum peak current surge as an upper limit of the deflection and its nearness of such approach depends upon the number and duration of current peaks which are sufficient in magnitude to advance the meter up to this point. The meter is thus a very suitable device, to be used in conjunction with a watt-hour meter which measures the actual power consumption over the same period, in arriving at the proper rate or penalty to charge a power customer who causes disturbing peak current surges.

At the end of the measurement period, the pointer 30 should be reset, although it is not important that the pointer be set exactly to zero because, if there is any current flowing at all, the pointer will immediately notch forward again. The fact that in resetting, the pointer 30 is not set all of the way back to zero does not alter the final demand meter reading in the usual case where it is used. However, the pointer should be reset well towards zero by manually controlled means and to provide for this we have made one of the gear wheels 28 of the drive train slidable to a demeshed position with respect to gear 29. This is represented in Fig. 3, where shaft 27 has the gears 28 and 26 secured thereto and is normally urged towards the front by spring 53. Endwise movement of shaft 27 in this direction is limited as by the pin shown at 54. Under these conditions gear 28 is in mesh with gear 29. Gears 24 and 26 are likewise in mesh. To reset pointer 30, shaft 27 with its gears is moved a small distance to the rear which demeshes gears 28 and 29. Spring 32 then unwinds and drives the pointer 30 toward a zero position. It will not be driven below a zero position because of the stop pins 34 and 34a. As mentioned above, an exact zero setting is not important. Shaft 27 may be moved to the rear by a tool inserted through a normally sealed front opening in the casing or it may be moved by pulling the shaft to the rear from the back of the casing. It is immaterial whether gears 24 and 26 are demeshed or not in this resetting operation. As soon as the pointer is reset, shaft 27 is released and spring 53 will force it back into driving relation. The spring 32 and operating characteristics of the meter are restored to their original conditions by such resetting operation.

The number of teeth in ratchet wheel 22, the various gear ratios and the scale calibration may be altered to suit the particular requirements of the peak load encountered and the penalty arrangements agreed upon. The meter is of relatively simple, rugged construction and may be provided with an easily read scale extending nearly 360 degrees, if desired.

The demand meter represented in Fig. 4 uses a variable air gap principle of operation and may have a uniform scale deflection. Parts which are substantially similar to those of Fig. 1 are indicated by like reference characters. It will be noted that the gear train has been reduced by eliminating two gears between the ratchet wheel shaft 23 and the spring winding shaft 14. Gear 24 meshes with a gear 55 which in turn meshes with a gear 56 on shaft 14. Pointer 30 is also mounted on the terminal shaft 14 instead of an intermediate shaft. These changes are not essential to the feature now to be described.

It will be noted that the armature 13 is mounted for rotation about a pivot at 57 and is no longer subjected to variable spring tension. It is biased to retracted position by an ordinary retracting spring 58. Its back stop consists of a cam 59 secured on shaft 14 in operative relation with pointer 30. A hump 60 on armature 13 is held against the adjacent surface of the cam when the armature is retracted. The retracted position of the armature is thus caused to vary depending upon the rotary position of shaft 14, pointer 30 and cam 59. When the pointer is at the low end of the scale 61, the high point of cam 59 serves as the back stop for the armature 13. Hence, a relatively small current surge in coil 12 will operate the armature to advance the pointer up-scale. This turns the cam clockwise and brings a lower part of its surface opposite the armature contact surface 60 and the armature air gap becomes greater, requiring a greater pulling flux and greater current surge to cause its attraction and operation. As we proceed further in this up-scale operation, the retracted position of the armature 13 becomes further and further away from the core of the electromagnet or the armature air gap increases until, for a full scale deflection, the low point of the cam becomes the armature back stop. In this modification, the tension of spring 32' is not important as it is not depended upon to determine the degree of current surge that will operate the device at any given point of the range of its operation. The spring 32' may, therefore, be one which is fairly weak but adequate to return the pointer to zero in a resetting operation, and which need not vary greatly in tension over the range of operation of the device. The work performed in advancing the demand meter mechanism at any given part of the range of operation is performed during the final part of the movement of the armature to attracted position. Hence, expected variations in friction of the gear train and tension of spring 32' need not have any influence on the calibration of the device. The calibration and scale distribution is primarily determined by the shape of cam 59 which is an automatically adjustable back stop for armature 13. The scale distribution may, if desired, be made uniform by properly shaping cam 59. The slope between the high and low ends of the cam has been somewhat exaggerated in the drawings for illustration purposes. The range of current surge operation may be extended as compared to the meter of Fig. 1 where the calibration and operation depends wholly upon the variation in tension of the spring.

In Fig. 4 where there is a variable throw of advancing pawl 21 at different points of the operating range, the pawl is nevertheless only permitted to advance the ratchet wheel 22 one notch for each operation. To this end it is held from contact with the ratchet wheel 22 by a guide pin shown at 62 over the variable initial part of its advancing movement and is allowed to come into driving contact with the ratchet wheel only during a final and constant part of its advancing movement sufficient to advance the ratchet wheel one full notch, but not two notches.

The principle of using the variable tension of a spring to automatically adjust the minimum current operating requirements of the meter as in Fig. 1 and the principle of using a variable air gap for this purpose, as in Fig. 4, may, of course, be combined to obtain varying degrees of both kinds of calibration, and one way of doing this is indicated in Fig. 5. Part of the mechanism of Fig. 1 is here reproduced consisting of the gear 31, shaft 14 and armature 13. The armature stop 20 of Fig. 1 is replaced by a variable cam stop 63 which is rotated from gear 31 by the gear 64. The spring 32 of Fig. 1 is replaced by a somewhat weaker spring 65. It is seen that here the minimum current surge that will attract armature 13 would be determined both by the tension of spring 65 and the armature air gap which in turn is determined by the shape and position of cam 63.

In accordance with the provisions of the patent statutes, we have described the principle of operation of our invention together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. A peak current demand meter comprising an electromagnet connected to be normally continuously energized in accordance with the variable load current in the circuit to be metered, a movable armature for said electromagnet biased to a retracted position and movable to an attracted position, a ratchet mechanism operated by said armature when attracted, a pointer advanced by such operation, means responsive to the movement of said armature to attracted position and effective only when in such attracted position for short-circuiting said electromagnet, and means responsive to repeated operations of said ratchet mechanism in progressively advancing the pointer for progressively modifying the operating characteristics of said meter in proportion to the peak energizing current of said electromagnet such that higher and higher values of energizing current of the electromagnet within the range of variation of said load current are required to enable it to operate the pointer advancing ratchet mechanism.

2. A peak current demand meter comprising an electromagnet, connections for normally continuously energizing said electromagnet in accordance with the current in a variable current load circuit to be metered, an armature for said electromagnet movable to an attracted position in response to an operative energization of said e'ectromagnet, means for retracting said armature when the edectromagnet is deenergized, means effective only when said armature is in an attracted position for deenergizing said electromagnet, a ratchet mechanism operated in response to the movement of said armature to and from its attracted position, a graduated scale, a pointer cooperating with said scale, a driving connection between said ratchet mechanism and pointer whereby the pointer is progressively advanced upward from the lower end of said scale in response to the operations of said ratchet mechanism, means for progressively modifying the operating characteristics of said meter in proportion to the advance of said pointer up-scale and in proportion to the peak current flow in the load circuit such that progressively higher values of energizing current of the electromagnet within the range of variation of such current are required for the operation of said ratchet mechanism and the further advance of said pointer, and manually controlled means for returning said pointer to the lower end of said scale and at the same time restoring the operating characteristics of said meter to their original condition.

3. A peak demand meter comprising an electro-magnet, connections for normally continuously energizing said electromagnet from a variable current circuit to be metered, an armature for the electromagnet movable to attracted position when the electromagnet is operatively energized, a spring for retracting said armature when the electromagnet is deenergized, means effective only when said armature is in attracted position for short-circuiting said electromagnet, a ratchet mechanism operated by the movement of said armature to and from attracted position, a graduated scale, a pointer cooperating with the scale and advanced step by step upward from the lower end of said scale in response to the operation of said ratchet mechanism, means normally preventing downscale movement of said pointer, driving means whereby the armature retracting spring is tensioned by the operation of said ratchet mechanism in proportion to the up-scale advance of said pointer and in proportion to the peak current flow in said circuit, and manually controlled means for releasing said spring whereby the spring returns the pointer to the lower end of the scale, said operation restoring said spring to substantially zero tension.

4. A peak demand meter comprising an electromagnet, connections for energizing said electromagnet from a circuit to be metered, an armature for said electromagnet movable from a retracted to an attracted position when said electromagnet is operatively energized, a spring for biasing said armature to its retracted position, a ratchet mechanism including a ratchet wheel operated by the movement of said armature to and from attracted position, a driving connection between said ratchet mechanism and spring whereby the operation of said ratchet mechanism tensions said spring, a graduated scale, a pointer connected to said driving mechanism so as to be advanced up-scale by the operation of said ratchet mechanism, the successive operations of said ratchet mechanism progressively advancing said pointer up-scale and progressively tensioning said spring, means for momentarily deenergizing said electromagnet after each advancing operation whereby its armature is immediately restored to its retracted position, means for preventing backward rotation of said ratchet wheel when the armature is retracted, and manually controlled means for interrupting said driving connection to cause the release of the tension of said spring and the return of said pointer to the lower end of its scale, the tension characteristics of the spring, the magnetic pull of the armature, and the scale calibration being proportioned and coordinated so that the meter measures and indicates peak demand.

5. A peak demand meter comprising an electromagnet having a pivoted armature biased to a retracted position and movable to an attracted position when the electromagnet is operatively energized, connections from the electromagnet to a circuit to be metered, an adjustable stop for determining the retracted position of the armature and the armature air gap of said electromagnet, a ratchet mechanism operated by the movement of the armature to and from attracted position, a graduated scale, a pointer cooperating with the scale and advanced upwardly of said scale by the electromagnetic operation of said ratchet mechanism, a spring tensioned by the ratchet mechanism when the pointer is advanced for returning the pointer to the lower end of the scale, said ratchet mechanism including a stop pawl for normally preventing such return movement of the pointer, manually controlled means for releasing the pointer and spring to enable the pointer to return towards zero position, means in operative relation with said pointer for moving the adjustable armature stop so as to increase the armature air gap of said electromagnet as the pointer is advanced up-scale, and means effective only when said armature is in its attracted position for deenergizing said electromagnet.

6. A peak demand meter comprising a graduated scale, a pointer cooperating therewith, a ratchet mechanism and gear train for advancing the pointer up-scale, an electromagnet having a pivoted movable armature for advancing the ratchet mechanism and pointer, connections for energizing said electromagnet from a circuit to be metered, resilient normally open contacts connected across the energizing circuit of said electromagnet and which are closed by the armature only in its attracted position for short-circuiting the electromagnet, means for immediately retracting the armature from attracted position when the electromagnet is deenergized, adjusting means for varying the minimum current operating requirements of said electromagnetically operated pointer advancing mechanism, said adjusting means being connected with the pointer advancing mechanism so that it is adjusted automatically with the movement of the pointer to increase such minimum current operating requirements as the pointer is advanced, means for normally preventing down-scale movement of said pointer, and means for disengaging gears in said gear train to reset the pointer to the lower end of the scale.

THEODORE A. RICH.
GEORGE F. GARDNER.